(12) United States Patent
Ng

(10) Patent No.: US 9,568,174 B2
(45) Date of Patent: *Feb. 14, 2017

(54) SYSTEM AND METHOD FOR PORTABLE LANTERN

(71) Applicant: Franklin Ng, Lafayette, CO (US)

(72) Inventor: Franklin Ng, Lafayette, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/082,296

(22) Filed: Mar. 28, 2016

(65) Prior Publication Data

US 2016/0209011 A1 Jul. 21, 2016

Related U.S. Application Data

(63) Continuation of application No. 14/497,186, filed on Sep. 25, 2014, now Pat. No. 9,341,356.

(51) Int. Cl.
| | | |
|---|---|---|
| *F21V 21/14* | (2006.01) | |
| *A45F 3/20* | (2006.01) | |
| *F21S 6/00* | (2006.01) | |
| *F21V 1/06* | (2006.01) | |
| *F21V 14/00* | (2006.01) | |
| *F21V 21/084* | (2006.01) | |
| *F21V 33/00* | (2006.01) | |
| *A45C 15/06* | (2006.01) | |

(52) U.S. Cl.
CPC ............... *F21V 21/145* (2013.01); *A45F 3/20* (2013.01); *F21S 6/004* (2013.01); *F21V 1/06* (2013.01); *F21V 14/00* (2013.01); *F21V 21/084* (2013.01); *F21V 33/008* (2013.01); *A45C 15/06* (2013.01)

(58) Field of Classification Search
CPC ...... F21V 21/145; F21V 14/00; F21V 21/084; F21V 33/008; A45F 3/20
USPC .................................................. 362/101, 189
See application file for complete search history.

(56) References Cited

U.S. PATENT DOCUMENTS

| | | | |
|---|---|---|---|
| 6,086,216 A | 7/2000 | Goldfarb | |
| 6,179,436 B1 | 1/2001 | Gitkind | |
| 6,186,637 B1 * | 2/2001 | Murrietta | A61J 9/00 362/101 |
| 6,254,247 B1 | 7/2001 | Carson | |
| 6,739,731 B2 | 5/2004 | Katzman | |
| 6,964,492 B1 | 11/2005 | Nicklowitz | |
| 6,984,052 B1 * | 1/2006 | Del Castillo | A61M 5/1411 362/101 |
| 7,384,164 B2 | 6/2008 | Yu | |
| 7,762,682 B2 | 7/2010 | Yang | |
| 7,771,073 B2 | 8/2010 | Chen | |
| 7,914,165 B2 | 3/2011 | Bertken | |
| 7,954,970 B2 | 6/2011 | Goldburt | |

(Continued)

*Primary Examiner* — Laura Tso
(74) *Attorney, Agent, or Firm* — Daniel W. Roberts

(57) ABSTRACT

Provided is a system and method for a portable lantern. The portable lantern includes a collapsible translucent hydration bladder, the bladder having an empty state that is suitable for compact storage and a liquid containing state. The bladder has a bottom section structured and arranged to expand and provide a base in the liquid containing state to support the bladder in a generally upright position. A light source suitable for temporary attachment to the outside of the hydration bladder is also provided, the light source emitting light through the bladder and dispersed by liquid when disposed within the bladder to provide a portable lantern. An associated method of use for a portable lantern is also provided.

21 Claims, 7 Drawing Sheets

(56) References Cited

U.S. PATENT DOCUMENTS

| | | |
|---|---|---|
| 7,976,177 B2 | 7/2011 | Dikopf |
| 8,087,809 B2 | 1/2012 | Tihaman et al. |
| 8,770,776 B1 | 7/2014 | Yang |
| 8,777,440 B2 | 7/2014 | Eves |
| 9,200,770 B2 | 12/2015 | Chun |
| 9,341,356 B2 * | 5/2016 | Ng .......................... A45F 3/20 |
| 2005/0036301 A1 | 2/2005 | Haines |
| 2007/0201220 A1 | 8/2007 | Ulicny |
| 2007/0206372 A1 | 9/2007 | Casillas |
| 2012/0224359 A1 * | 9/2012 | Chun ....................... F21S 8/00 362/183 |
| 2013/0187569 A1 * | 7/2013 | Chin-Huan ............ F21V 3/026 315/307 |

* cited by examiner

SYSTEM AND METHOD FOR PORTABLE LANTERN

CROSS REFERENCE TO RELATED APPLICATIONS

The present application is a continuation of U.S. patent application Ser. No. 14/497,186, filed Sep. 26, 2014 and entitled SYSTEM AND METHOD FOR PORTABLE LANTERN, now U.S. Pat. No. 9,341,356. This continuing application claims the benefit of U.S. patent application Ser. No. 14/497,186 the disclosure of which is incorporated herein by reference.

FIELD OF THE INVENTION

The present invention relates generally to the field of portable lighting devices commonly referred to as lanterns, and more specifically to a system and method for providing a portable lantern having a compact state for storage and a liquid containing state suitable for backpacking or other activities for which multifunction equipment is often desired to maximize functionality and minimize excess weight.

BACKGROUND

Portable lighting devices such as lanterns used for backpacking or other night time, or dark environment activities, are typically simple purpose devices and relatively bulky. Differing somewhat from a typical flashlight that is generally intended to provide a focused beam of light in a specific direction, a lantern is typically intended to provide more general illumination to a proximate area about the lantern.

With a typical lantern, an illumination device, such as flame, or incandescent, florescent or LED light bulb is disposed within a housing that serves to protect the light source and often diffuses the light so as to provide a more uniform glow about the lantern. This housing, the light source and the associated power source, be it fuel or battery, collectively occupy a significant amount of space—a space that must be accommodated whether or not the lantern is in use.

As noted, one frequent aspect of a lantern is the ability to diffuse light provided by a light source so as to provide a more generalized and aura of illumination. In addition to physical reflectors and coatings some materials, such as generally clear liquids like water, may naturally act to diffuse light. With respect to portable illumination, various attempts have been made to utilize this light diffusing property of water, but limitations remain such that the devices fall far short of a truly portable lantern that among other things is easy to store.

Products containing liquids and a light source are a common novelty item. In the competitive market of consumer beverages, finding ways to help draw attention to ones product is a frequent task so as to improve marketing and sales. US Patent Application 2007/0206372 to Casillas teaches an illuminated Container for a beverage consisting of a container 2 having a convex recess 6 formed into a sidewall 7 extending into the interior 8 of the container 2 so that a light source, LED 12 placed inside the recess 6 will illuminate the liquid beverage within the container. An interesting concept, this device falls far short of practicality for a portable lantern in several ways. The light source is rigidly affixed in place and cannot be removed. In addition, as with most typical commercial beverage containers, the container 2 as taught clearly occupies the same space whether empty or full. Moreover, it is a ridged container.

US Patent Application 2007/0201220 to Ulicny teaches a similar device—an illuminated container 100, preferably made of glass, including a bottle 102 having a base unit 130 housing a lighting unit 140, the base unit secured to the bottom end 102b of the bottle 102. Ulicny further teaches the bottle preferably having three sides 106a, 106b and 106c and thereby having a triangular cross section. The base unit 130 is configured to seat over the exterior surface of the base 108 of the bottle 102. This device too falls short of practicality for a portable lantern. Moreover Ulicny seems directed towards marketing, as the bottle 102 is clearly ridged and preferably triangular in shape. Additionally, the light source 144 is also taught to be matched to the color of the liquid and/or matched to the color of the sides 106a-c, and further that for some embodiments the light source is rigidly affixed to the base 108 of the bottle 102.

U.S. Pat. No. 6,739,731 to Katzman teaches a Container For Potable Liquid taught to be a soft drink container 10 constructed of plastic. In addition to a central cavity 12 open to the bottom of the container 10 and structured to receive a cartridge 18 that may be triggered to result in an endothermic reaction, the device also comprises a chemical luminescent material so as to illuminate the beverage trademark. Katzman teaches that the luminescent material may be contained either within the container, assuming the container is transparent, or affixed to the outside. In either case the luminescent material appears rigidly affixed and cannot be removed. In addition, as Katzman specifies the container to be a soft drink container, it is well known that the soft drink container occupies the same space whether empty or full. Moreover, though it may have some limited elasticity, it is more properly considered a ridged container.

U.S. Pat. No. 6,964,492 to Nicklowitz teaches a similar device—an illuminable Container 10 having an outer body 12 having a top end 13 with an opening for adding liquid to and pouring liquid from the body 12. The container also has a base 19 opposite from the top end 13. The base 19 is flat so as to provide stability to the container, and the base 19 has a recess 22 that extends upwards from the center of the base 19 into the container 10 and provides a retention channel 16 within the container 10 for receiving a light source 14. Moreover the disposed light source is disposed entirely within the container 10, though separated from any enclosed liquid by material providing the container 10, base 19 and retention channel 16. As the base 19 is specifically taught to be flat so as to provide stability to the container, it is clear that the container is ridged so as to maintain the angular relationships between at the very least the base 19, outer body 12, recess 22 and retention channel 16. Moreover this is again a ridged container that occupies the same space whether empty or full. Nicklowitz distinguishes itself over Katzman by providing a cap having a shape corresponding to the shape of the base and which may be selectively connected to the base to further seal the light source within the retention channel, and presumably to provide an enhanced level base.

U.S. Pat. No. 7,771,973 to Chen for a Luminous Water Bottle teaches a very familiar sports water bottle having a body 1, a lid 2 and a lighting assembly 3 that is disposed within the body 1 through the bottom wall 13. As users of water bottles will recognize, most water bottles can be squeezed so as to expel the liquid contents more quickly. After squeezing, the resilient nature of the material from which the bottle is made permits it to spring back to the original shape. In other cases the water bottle may be formed from a truly ridged material that can not be squeezed without risk of cracking. Either way, this is again a generally ridged container that occupies the same space whether empty or full.

U.S. Pat. No. 6,179,436 to Gitkind for a Backpack Lantern teaches the coupling of a flashlight 1 by an elastomeric coupler 2 to the non-opaque lid 5 of a non-opaque container 3. The container 3 taught may also function as a container for drinking water or other fluids or solids. The nature of the elastomeric coupler 2 and how it is attached to both the flashlight 1 and the container 3 makes it quite clear that when so assembled, to act as a lantern, the container 3 cannot be opened and the contents therein enjoyed. And again, although the flashlight 1 and container 3 may be separated when use of the lantern is not desired, the physical space occupied by the flashlight 1 and the container 3 as well as the coupler 3 remains unchanged.

Moreover each of these references teaches a generally ridged container that occupies the same space whether in use or not, and whether full of liquid or not. In addition, because each of these devices is taught to have a flat bottom, each device is clearly intended to be placed on a flat surface. Moreover the device cannot conform to an uneven surface, such a rock or even a gently sloping surface and is therefore at risk of falling over.

Hence there is a need for a method and system that is capable of providing a portable lantern while overcoming the above identified challenges and or limitations.

SUMMARY

This invention solves the problems of the prior art by providing novel systems and methods for providing a portable lantern.

In particular, and by way of example only, according to one embodiment of the present invention, provided is a portable lantern, including: a collapsible translucent hydration bladder, the bladder having an empty state that is suitable for compact storage and a liquid containing state, the bladder having a bottom section structured and arranged to expand and provide a base in the liquid containing state to support the bladder in a generally upright position; and a light source suitable for temporary attachment to the outside of the hydration bladder, the light source emitting light through the bladder and dispersed by liquid when disposed within the bladder to provide a portable lantern.

In yet another embodiment, provided is a portable lantern, including: a collapsible translucent hydration bladder having a bottom section structured and arranged to expand and provide a base in a liquid containing state to support the bladder in a generally upright position, the base further providing a flexible convex recess to receive a light source; and a light source suitable for temporary placement within the convex recess of the base, the light source emitting light through the bottom of the bladder and dispersed by liquid when disposed within the bladder to provide a portable lantern.

For yet another embodiment, provided is a portable lantern, including: a collapsible translucent bladder structured and arranged to hold a liquid, the bladder having an empty state that is suitable for compact storage and a liquid containing state, the bladder having a bottom section structured and arranged to expand and provide a base in the liquid containing state to support the bladder in a generally upright position, the base further providing a convex recess and a coupler; and a light source suitable for temporary placement within the convex recess of the base, the light source further having an attacher suitable for engaging with the coupler to temporarily bind the light source within the convex recess, the light source emitting light through the bottom of the bladder and dispersed by liquid when disposed within the bladder to provide a portable lantern.

And, for yet still another embodiment, provided is method of providing a portable lantern, including: providing a collapsible translucent bladder structured and arranged to hold a liquid, the bladder having an empty state that is suitable for compact storage and a liquid containing state, the bladder further having a bottom section structured and arranged to provide a base in the liquid containing state to support the bladder in a generally upright position, the base further providing a convex recess and a coupler; providing a liquid into the bladder to achieve the liquid containing state; and temporarily disposing a light source within the convex recess of the base, the light source further having an attacher suitable for engaging with the coupler to temporarily bind the light source within the convex recess, the light source emitting light through the bottom of the bladder and dispersed by the liquid within the bladder to provide a portable lantern.

BRIEF DESCRIPTION OF THE DRAWINGS

At least one system and method for a portable lantern will be described, by way of example in the detailed description below with particular reference to the accompanying drawings in which like numerals refer to like elements, and.

DETAILED DESCRIPTION

Before proceeding with the detailed description, it is to be appreciated that the present teaching is by way of example only, not by limitation. The concepts herein are not limited to use or application with a specific system or method for providing one or more portable lanterns. Thus, although the instrumentalities described herein are for the convenience of explanation shown and described with respect to exemplary embodiments, it will be understood and appreciated that the principles herein may be applied equally in other types of systems and methods of providing and using a portable lantern.

This invention is described with respect to preferred embodiments in the following description with reference to the Figures, in which like numbers represent the same or similar elements. Further, with the respect to the numbering of the same or similar elements, it will be appreciated that the leading values identify the Figure in which the element is first identified and described, e.g., portable lantern 100 appears in FIG. 1.

Figure 1:
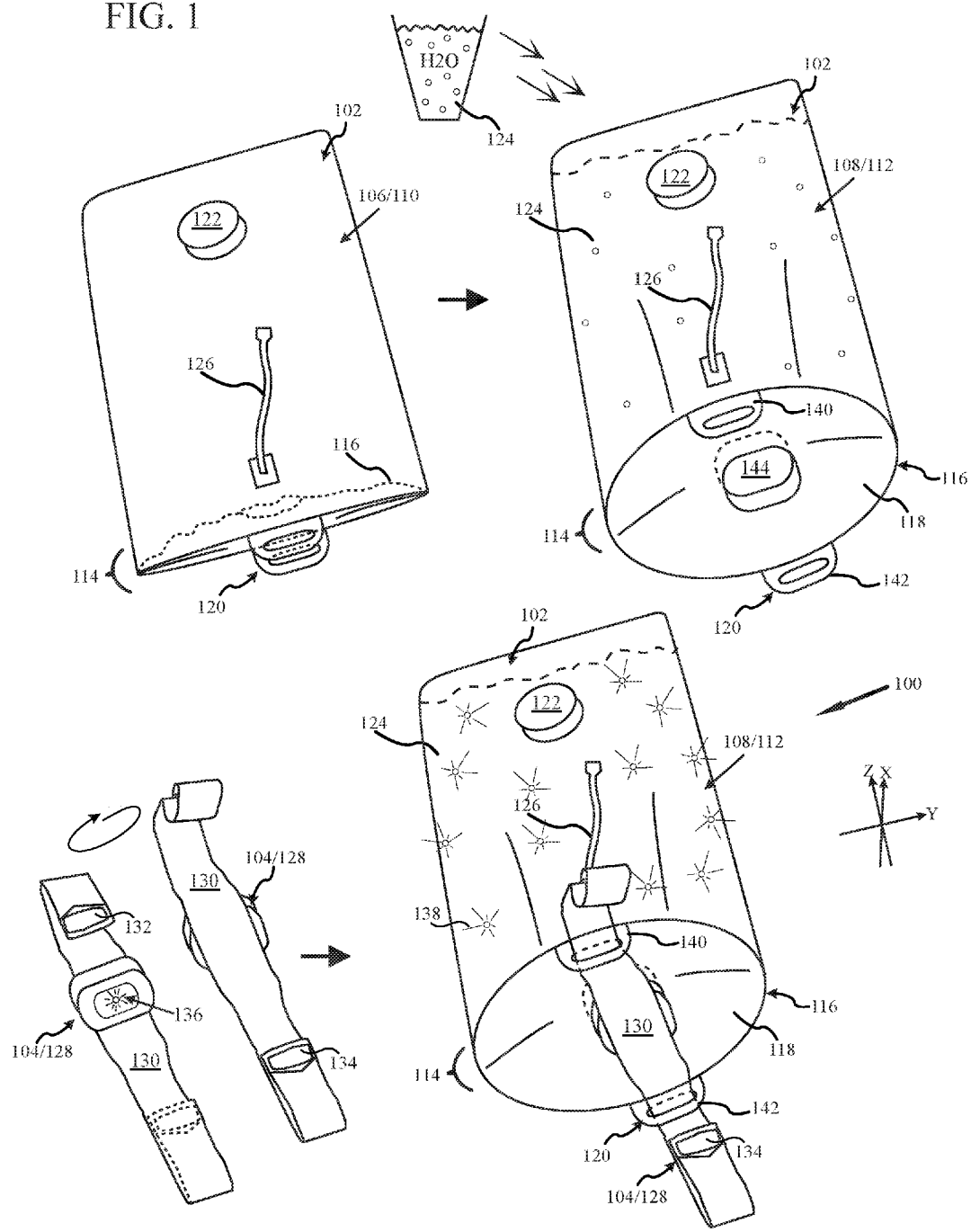
FIG. 1 illustrates a perspective view of a portable lantern in accordance with certain embodiments of the present invention.

Turning now to the drawings, and more specifically FIG. 1, there is shown a portable lantern 100 according to at least one embodiment. To facilitate the description of the portable lantern 100, the orientations of the portable lantern 100 as presented in the figures are referenced to the coordinate system with three axes orthogonal to each other as shown in FIG. 1.

These axes intersect mutually at the origin of the coordinate system, which is chosen to be the center of the portable lantern 100, however the axis shown in all figures are offset from this center point of the portable lantern for ease and clarity of illustration. Moreover, FIG. 1 is a perspective view of an embodiment of portable lantern 100 in accordance with the X, Y and Z-axis as shown.

As shown in FIG. 1, portable lantern 100 is generally provided by a collapsible hydration bladder 102 and a light source 104 suitable for temporary attachment to the outside of the hydration bladder 102. The nature of the collapsible translucent hydration bladder 102 is highly advantageous, as it has both a compact first state 106 that is suitable for compact storage and an expanded second state 108 suitable for containing a liquid. Moreover, the first state 106 may be understood and appreciated as an empty state 110 and the second state 108 maybe understood and appreciated as a liquid containing state 112. As is further discussed below, the empty state 110 has a first internal volume and the liquid containing state 112 has a second internal volume, the second internal volume being at least two (2) times greater than the first internal volume.

It is also to be specifically appreciated that the first state 106, i.e. the empty state is the natural state of hydration bladder 102 when not containing a liquid. In other words, when empty, the hydration bladder 102 reverts to an initial state having an internal volume that is substantially less then when it is in a normal liquid containing state. Moreover, unlike conventional liquid containers which have a constant internal volume whether empty or full, hydration bladder 102 has an empty state 106, 110 that is fundamentally different in volume from it's liquid containing state 108, 112. The transition from the second state 108, i.e. liquid containing state 112 to the first state 106, i.e. empty state 110 requires nothing more than the removal of the liquid. Of course for at least one embodiment it is understood and appreciated that additional compression may be applied so as to impart an even more compact state to the hydration bladder 102 in the first state 106, i.e. empty state 110, but such external compression is not required.

The hydration bladder 102 has a bottom section 114 that is structured and arranged to expand and provide a base 116 in the second state 108, i.e., the liquid containing state 112, to support the hydration bladder 102 in a generally upright position. The hydration bladder 102 is also understood and appreciated to be translucent. For at least one embodiment the hydration bladder 102 is substantially transparent. Indeed as applied and used herein with respect to the hydration bladder 102 and the portable lantern, for at least one embodiment the term translucent is understood and appreciated to encompass the standard definitions of "translucent," "transparent" and "non-opaque."

For at least one embodiment, the base 116 further provides a convex recess 118 to receive the light source 104. The bottom section 114 also provides at least one coupler 120 to assist with temporarily coupling the light source 104 against the convex recess 118. Light of course may be appreciated as a wave. In optics, the angle of incidence is the angle between a ray incident on a surface and a line normal to the surface at the point of incidence. To achieve the advantageous portable lantern 100 as set forth herein, the temporary coupling of the light source 104 against the convex recess 118 is intended to achieve a presentation of the light waves as close to the normal as possible so as to achieve maximum transmission of the light into the hydration bladder. To the extent that some light waves reflect off the surface of the hydration bladder material, as the light source 104 is physically against the material, the reflected rays may well be re-directed by the reflector(s) within the light source 104 back into the hydration bladder 102.

As shown, the hydration bladder 102 has at least one valve 122 which may be operated by a user so as to introduce a liquid such as water 124 into the hydration bladder 102 and in so doing transition the state of the hydration bladder 102 from the empty state 110 to the expanded liquid containing state 112. This liquid, such as water 124 will also serve to diffuse and or disperse the light as provided by the light source 104 through the material of the hydration bladder and thereby provide the portable lantern 100.

In varying embodiments the hydration bladder 102 may also have one or more additional valves, such as a bite valve 126 permitting a user to sip liquid, such as water 124 from the hydration bladder 102 whether or not the light source 104 is attached. Moreover, it is understood and appreciated that the coupler 120 is distinct in location and operation from valve 122 and or valve 126 such that liquid, such as water 124, may be deposited into or extracted from the hydration bladder 102 during use and enjoyment as the portable lantern 100.

The nature of the primary valve 122 and or additional valve 126 may vary based on the fabrication of the hydration bladder, and is selected from the group consisting of, but not limited to, twist on cap, quick snap cap, a two part closure such as a zip-lock seal, bite valve, or other structure that permits both the opening and sealing of the hydration bladder 102.

For at least one embodiment, the light source 104 is a headlamp 128 as is commonly and commercially available for campers, hikers, runners, cyclists or other people desiring a portable light source that they can temporarily place on their head. The light source 104 is also understood and appreciated to have an attacher suitable for engaging with the coupler 120 to temporarily bind the light source at least partially within and against the convex recess 118.

For an embodiment where the light source 104 is a headlamp, the attacher is appreciated to be a strap 130. As shown, the coupler 120 permits temporary engagement of the strap 130. The strap as illustrated has been shown to have a fasteners 132 and 134 at either end of the strap 130, and it is understood and appreciated that as with most head lamps these fasteners 132 and 134 may be adjusted to provide a desired amount of tension through the strap 130. When the strap 130 is engaged by the coupler 120 and fastened, this tension may assist in engaging the headlamp 128 against the convex recess 118. In FIG. 1 the strap 130 has been shown as unfastened so as not to obscure the depiction of the headlamp as disposed against the convex recess 118.

When so positioned, light 136 from the headlamp 128 is emitted through the material of the hydration bladder 102 and dispersed by the liquid, such as water 124, and emanates from the hydration bladder 102 as shown conceptually by star spots 138.

As shown, in at least one embodiment the coupler 120 is provided as a set of opposing slots 140 and 142 disposed in, or attached to, the sidewalls of the bottom section 114. As shown for ease of illustration and discussion, for at least one embodiment tabs extending slightly from the bottom section 114 provide these opposing slots 140 and 142. In alternative embodiments, these slots 140 and 142 may be integrated within the bottom section 114 such that they do not extend below the bottom section 114.

In further addition, although shown and described as slots 140 and 142, it is understood and appreciated that the coupler 120 may be achieved by other structures such as but not limited to Velcro, hooks, snaps, clips, or other such temporary fastening and coupling devices as may be suitable for varying embodiments.

In addition, as shown, the convex recess 118 may further provide a hollow 144 structured and arranged to receive at least a portion of the headlamp 128. This hollow 144 may also impart a partial frictional squeeze hold upon at least a portion of the headlamp 128 due to the pressure of the liquid, such as water 124, partially conforming the hollow 144 about at least a portion of the headlamp 128. Moreover, for at least one embodiment the convex recess 118 with or without the hollow 144 is structured and arranged to receive the headlamp 128 and integrate it as a temporary structural element providing additional support to the base 116 in supporting the portable lantern 100.

Moreover, for at least one embodiment a portable lantern 100 is provided having a collapsible translucent hydration bladder 102 having a bottom section 116 structured and arranged to expand and provide a base 118 in a liquid containing state to support the bladder 102 in a generally upright position. The base 116 further providing a flexible convex recess 118 to receive a light source 104. The portable lantern further includes a light source 104 suitable for temporary placement within the convex recess 118 of the base 116, the light source 104 emitting light 136 through the bottom of the bladder 102 and dispersed by liquid when disposed within the bladder 102 to provide a portable lantern 100.

Figure 2A:
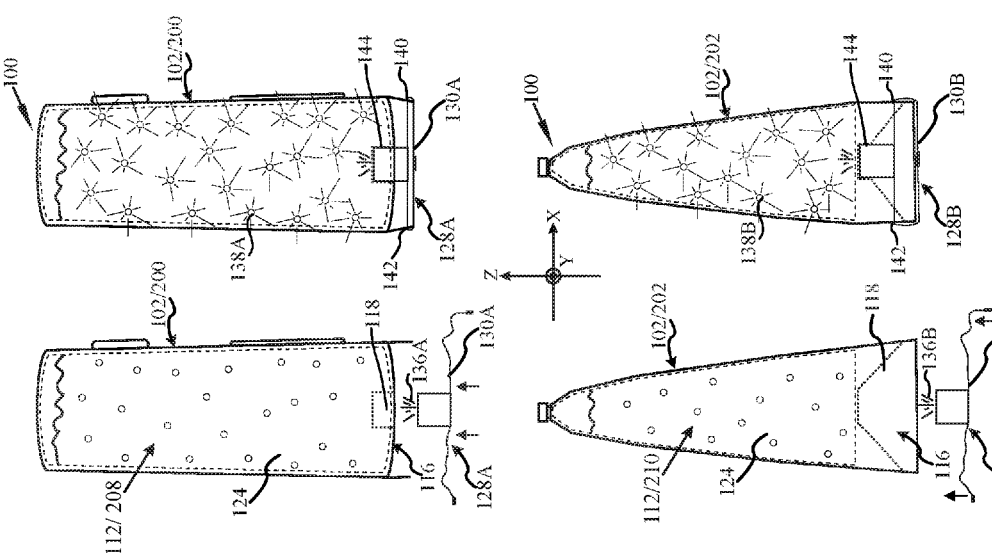
FIGS. 2A-2B show top and side views of portable lanterns depicting the change in volume between a first state and a second state in accordance with certain embodiments of the present invention.
Figure 2B:
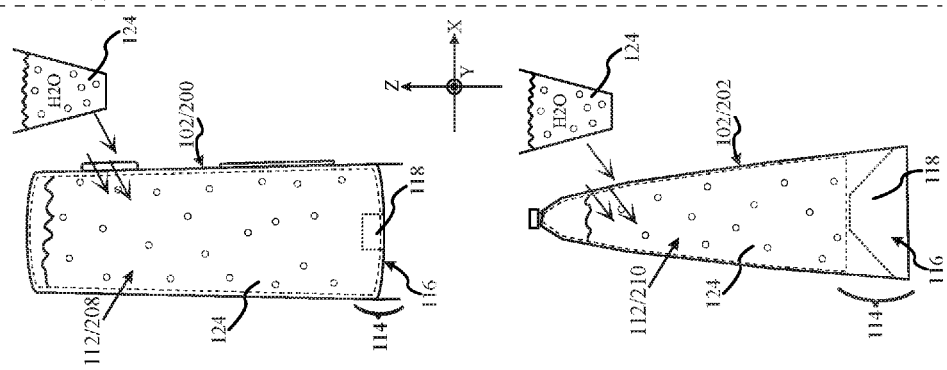
Figure 2C:
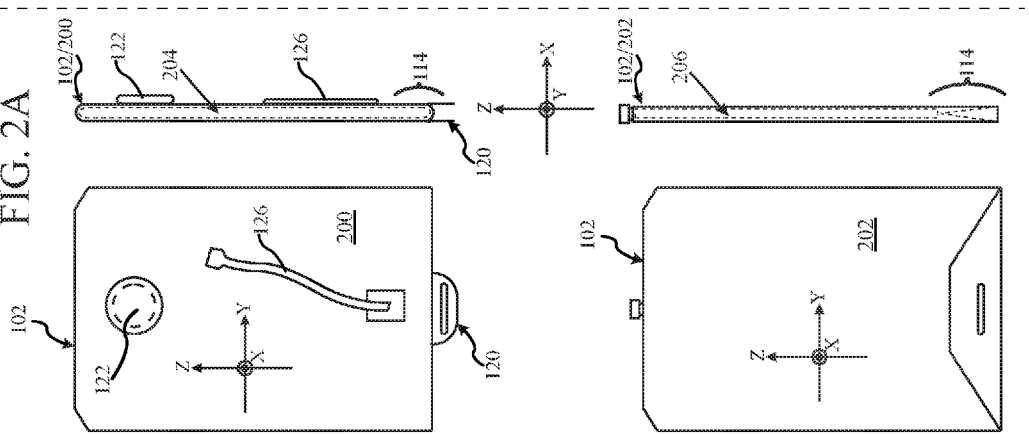
FIG. 2C shows a side views of portable lanterns depicting the temporary attachment of a light source in accordance with certain embodiments of the present invention.
Figure 3:
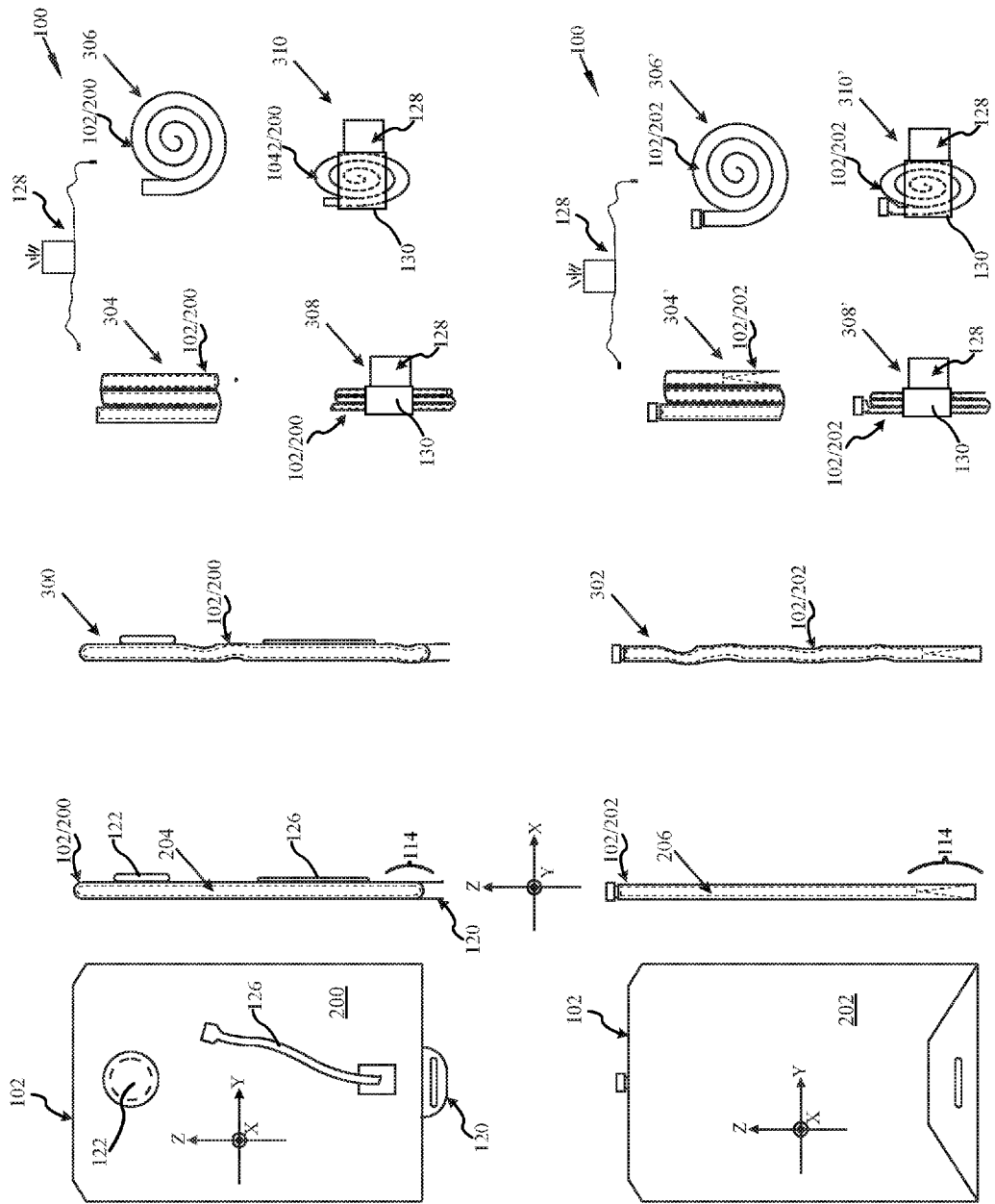
FIG. 3 shows the compact nature of portable lanterns in accordance with certain embodiments of the present invention.

The collapsible nature of the hydration bladder may be more fully appreciated with respect to FIGS. 2 and 3. More specifically, FIG. 2A presents a top and side view of hydration bladder 102 in accord with at least two options, specifically hydration bladder 200 as provided by one or two generally continuous pieces of fabrication material and hydration bladder 202 as provided by a plurality of fabrication material elements that have been inseparably joined. This alternative embodiment is further discussed and described below with respect to FIG. 6.

Moreover, the type of fabrication material providing the hydration bladder 102 is of course understood to be flexible and collapsible—however in varying embodiments different materials may be used so as to also impart an elastic quality to the hydration bladder 102 so that it may stretch to accommodate a greater volume of liquid, such as water 124, then might be otherwise suggested by viewing the hydration bladder 102 in its empty state 110.

Indeed, the fabrication material for the hydration bladder 102 so as to provide variations of hydration bladder 200 and hydration bladder 202 will typically be one or more types selected from, but not exclusively limited to: Plastics, Thermoplastics, Polyethylene(s), Linear Low Density Polyethylene (LLDPE), Low Density Polyethylene (LDPE), Polyurethane, Polyethylene Terephthalate Glycol-modified (PETG), Mylar, and Vinyl.

Indeed combinations of these materials may be used in one or more layers such as the innermost layer being made from FDA-approved polyethylene that is then bonded to two layers of nylon for strength and durability. Anti-bacterial and or anti-microbial compounds may also be applied to or integrated with one or more layers. For purposes of discussion, hydration bladder 200 may be considered similar to the Camelbak® hydration pack and hydration bladder 202 may be considered similar to the Platypus® Platy® bottle.

Respectively, FIG. 2A shows the top and side views of hydration bladders 200 and 202 in their empty state 110, each having a first internal volume 204 and 206 respectively. In addition, as was shown in FIG. 1, it is further appreciated that the bottom section 114 of each hydration bladder 102, i.e., hydration bladders 200 and 202, is structured and arranged to lie flat in the empty state 110.

As shown in FIG. 2B a liquid, such as water 124 is introduced into hydration bladder 200 and hydration bladder 202 expanding them to achieve a liquid containing state 112 having a second internal volume 208 and 210 respectively.

For the purposes of illustration and discussion, the liquid containing state 112 as shown in FIG. 2B has been shown to be substantially at about the maximum liquid containing state 112 and correspondingly having a maximum second internal volume 208 and 210 respectively. Clearly second internal volume 208 is at least 2 times greater then the first internal volume 204 for hydration bladder 200, and likewise second internal volume 210 is at least 2 times greater then the first internal volume 206 for hydration bladder 202. Moreover, as shown in FIG. 2A in the empty state 110 each bladder is generally flat whereas in the liquid containing state 112 each bladder is generally cylindrical It is of course understood and appreciated that as between the empty state 110 and maximum liquid containing state 112 there are a range of possible second volumes depending upon how much liquid, such as water 124 has been introduced or extracted. In general, so as to provide sufficient weight for stability and a quantity of liquid sufficient to disperse the emitted light, the second volume is greater then the first volume and generally at least two times greater then the first volume.

The temporary attachment of the light source 104 may also be further appreciated as shown in FIG. 2C. With respect to hydration bladder 200, headlamp 128A is shown emitting light 136A and is at first disposed proximate to the bottom section 114 of hydration bladder 200. With the strap 130A passed through slots 140 and 142 and fastened, the headlamp 128A is at least partially disposed within the convex recess 118, and more specifically the hollow 144. Light 136A from the headlamp 128A passes through the hydration bladder 200 and is dispersed by the liquid, such as water 124, as shown conceptually by star spots 138A.

Similarly, with respect to hydration bladder 202, headlamp 128B is shown emitting light 136B and is at first disposed proximate to the bottom section 114 of hydration bladder 200. With the strap 130B passed through slots 140 and 142 and fastened, the headlamp 128B is at least partially, and more specifically entirely, disposed within the convex recess 118. Light 136B from the headlamp 128B passes through the hydration bladder 200 and is dispersed by the liquid, such as water 124, as shown conceptually by star spots 138B.

Moreover, the light source 104 need not be disposed entirely within either hydration bladder 102 to achieve portable lantern 100. Indeed, for cleaning purposes it may be desired for at least one embodiment for the convex recess to be very smooth and free of sharp angles defining the convex recess 118.

Indeed as noted above, and more fully appreciated in FIG. 2C, the light source 102, e.g., headlamp 128A in the case of hydration bladder 200 and headlamp 128B in the case of bladder 202 is temporarily coupled in such a fashion so as to dispose the light emitting surface of the headlamp 128A, 128B against the convex recess 118 in such a manner as to reduce the likelihood of critical angle and reflection as the light propagates from the light source 104 through the material of the hydration pouch and into the liquid contained therein.

FIG. 3 is presented to further illustrate the highly advantageous nature of the hydration bladder 102 not only having a compact empty state having an empty volume significantly less than it's liquid containing state 112, but also how the flexibility of materials provides a highly advantageous storage aspect to portable lantern 100.

Moreover, the top and side view of hydration bladder 102 in accord with the at least two options as shown in FIG. 2 are shown again. In addition, the flexibility and fungible nature of hydration bladder 200 and hydration bladder 202 is further exemplified by the slightly warped illustrations 300 and 302.

Moreover, it is understood and appreciated that hydration bladder 102, and more specifically hydration bladder 200 and hydration bladder 202 are substantially limp when empty. This is to say that their construction materials are not ridged in the sense of maintaining the same shape whether empty or full. More specifically, the empty state of hydration bladder 102, and more specifically hydration bladder 200 and hydration bladder 202 is suitable for storage by folding 304 or rolling 306. In addition, for at least one embodiment, a compressive force may even be applied so as to further reduce the physical space occupied by the folded 304' or rolled 306' state of hydration bladder 200 and hydration bladder 202.

Further still, for at least one embodiment, to further facilitate compact storage of portable lantern 100, the headlamp 128 may be fastened about the folded or rolled hydration bladder 102, and more specifically hydration bladder 200 and hydration bladder 202 as shown with illustrations 308, 308', 310 and 310'.

Moreover, to summarize yet again with respect to the characteristics of compact storage and the changing nature of the hydration bladder 102, a portable lantern 100 is provided for at least one embodiment by a collapsible translucent bladder 102 structured and arranged to hold a liquid 124, the bladder 102 having an empty state 110 that is suitable for compact storage and a liquid containing state 112. The bladder has a bottom section 114 structured and arranged to expand and provide a base 116 in the liquid containing state 112 to support the bladder 102 in a generally upright position. The base 116 further provides a convex recess 118 and a coupler 120. Portable lantern 100 also includes a removable a light source 104 suitable for temporary placement within the convex recess 118 of the base 116. The light source 104 has an attacher 130 suitable for engaging with the coupler 120 to temporarily bind the light source 104 within the convex recess 118. The light source emits light 136 through the bottom of the bladder 102 which is dispersed by liquid when disposed within the bladder 102 to provide a portable lantern 100.

Figure 4:
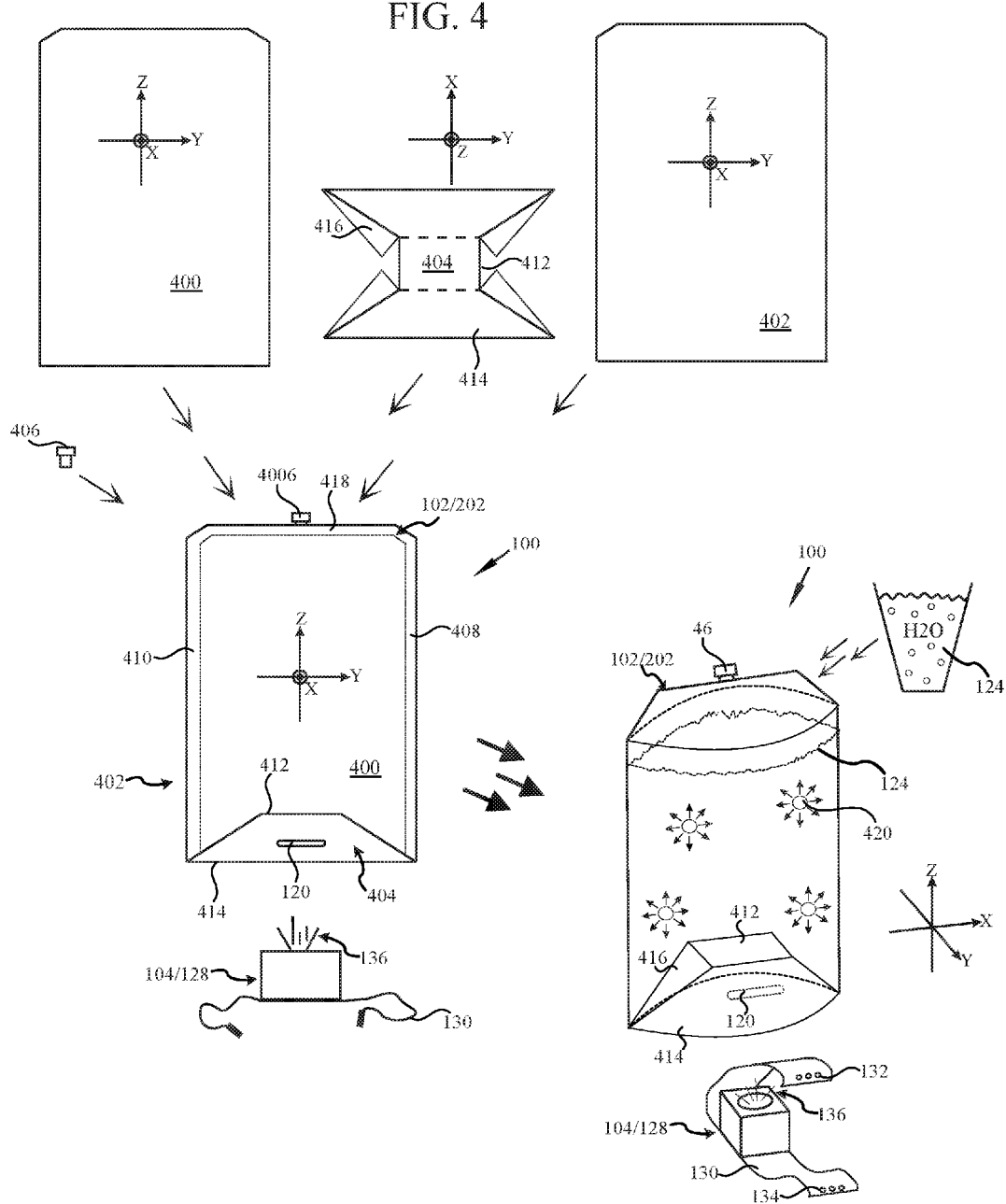
FIG. 4 shows the components for assembly of a portable lantern in accordance with certain embodiments of the present invention.

As noted, for at least one embodiment, hydration bladder 102 is provided by a plurality of fabrication material elements, such as for hydration bladder 202. FIG. 4 conceptually illustrates such an embodiment. More specifically, as shown in FIG. 4 there are two flexible panels 400 and 402, a folded flexible panel 404 and a valve 406. For this embodiment, the two flexible panels 400 and 402 provide the primary body portion of hydration bladder 202 and folded flexible panel 404 provides the base 116.

For assembly, the two flexible panels 400 and 402 are generally symmetrically aligned and bonded along at least each vertical side edge 408 and 410. Folded flexible panel 404, initially shown in an unfolded state, has a central portion 412 and an outer portion 414. Folded flexible panel 404 may be generally described as having an "X" shape when unfolded and a "V" shape when folded. For the embodiment shown, folded flexible panel 404 also has bonding tabs 416 that assist in the formation of the intended base 116.

Folded flexible panel 404 is disposed between the two flexible panels 400 and 402 with the central portion 412 disposed inwards towards the interior of the hydration bladder 202. The outer portion 414 is bonded to the corresponding flexible panel in proximate contact with the folded panel. If not previously established, a coupler such as slots 140 and 142 may now also be cut, stamped, or otherwise provided.

A liquid valve 406 is bonded between the flexible panels 400 and 402 along the top edge 418 opposite from the base 116 as provided by the folded flexible panel 404. For at least one alternative embodiment, the top edge 418 may be bonded and at least one liquid valve is disposed in either panel 400 or panel 402.

The bonding between panels 400 and 402, folded flexible panel 404 and valve 406 may be accomplished in a variety of different ways as appropriate for the type or types of materials in use. For example, in varying embodiments, this bonding may be achieved by thermal welding, sonic welding, glue adhesion, and or solvent induced adhesion. Although shown as distinct elements, it is also understood and appreciated that each panel may in fact be comprised of a plurality of layers or distinct panels that are themselves bonded together prior to or during the overall assembly process.

For at least one embodiment, the folded flexible panel 400 is folded in an origami fashion so as to lie flat when the hydration bladder 202 is in an empty state 110 and transform into an expanded state and provide the base 116 with convex recess 118 when the hydration bladder 202 is in a liquid containing state 112.

As is also shown in FIG. 4, when a liquid, such as water 124 is disposed within the hydration bladder 202, liquid pressure 420 is provided by the water 124 against the inside of the hydration bladder 202. This pressure 420 serves to expand the hydration bladder 202 and as shown, causes the folded flexible panel 404 to substantially unfold and provide base 116 and convex recess 118. Of course this pressure 420 is also present in alternative embodiments of hydration bladder 102, such as hydration bladder 200 where again this pressure will cause the one or two generally continuous pieces of fabrication material to expand and similarly provide the base 116 and convex recess 118. In addition, this pressure 420 may provide at least a partial compressive grip of the convex recess about the removable light source 104, thereby further assuring it's proper optical coupling with the hydration bladder 102 and that the removable light source 104 remains properly affixed during the period of desired use of portable lantern 100.

Figure 5:
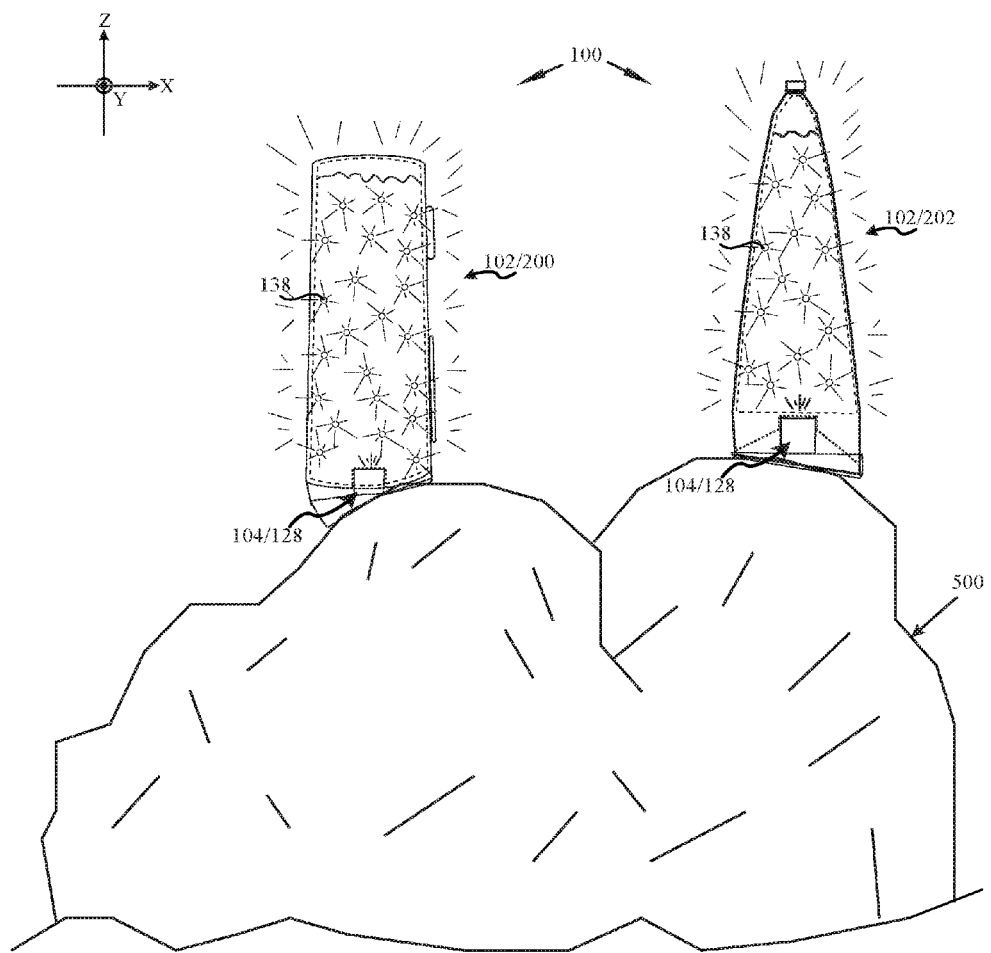
FIG. 5 shows portable lanterns disposed on an uneven surface in accordance with certain embodiments of the present invention.

Moreover, this pressure 420 maintains the liquid containing state of the hydration bladder 102 and permits the portable lantern 100 to remain in a generally upright position when in use as is shown in FIG. 5. In addition, because of the flexible nature of the hydration bladder 102, if the ground or surface upon which the portable lantern 100 is disposed is uneven, or otherwise not level such as rock 500, in most cases a user will be able to position the portable lantern 100 so that it will self level as the weight of the liquid causes the hydration bladder 102 to confirm at least in part to the surface upon which the portable lantern 100 has been set.

Figure 6:
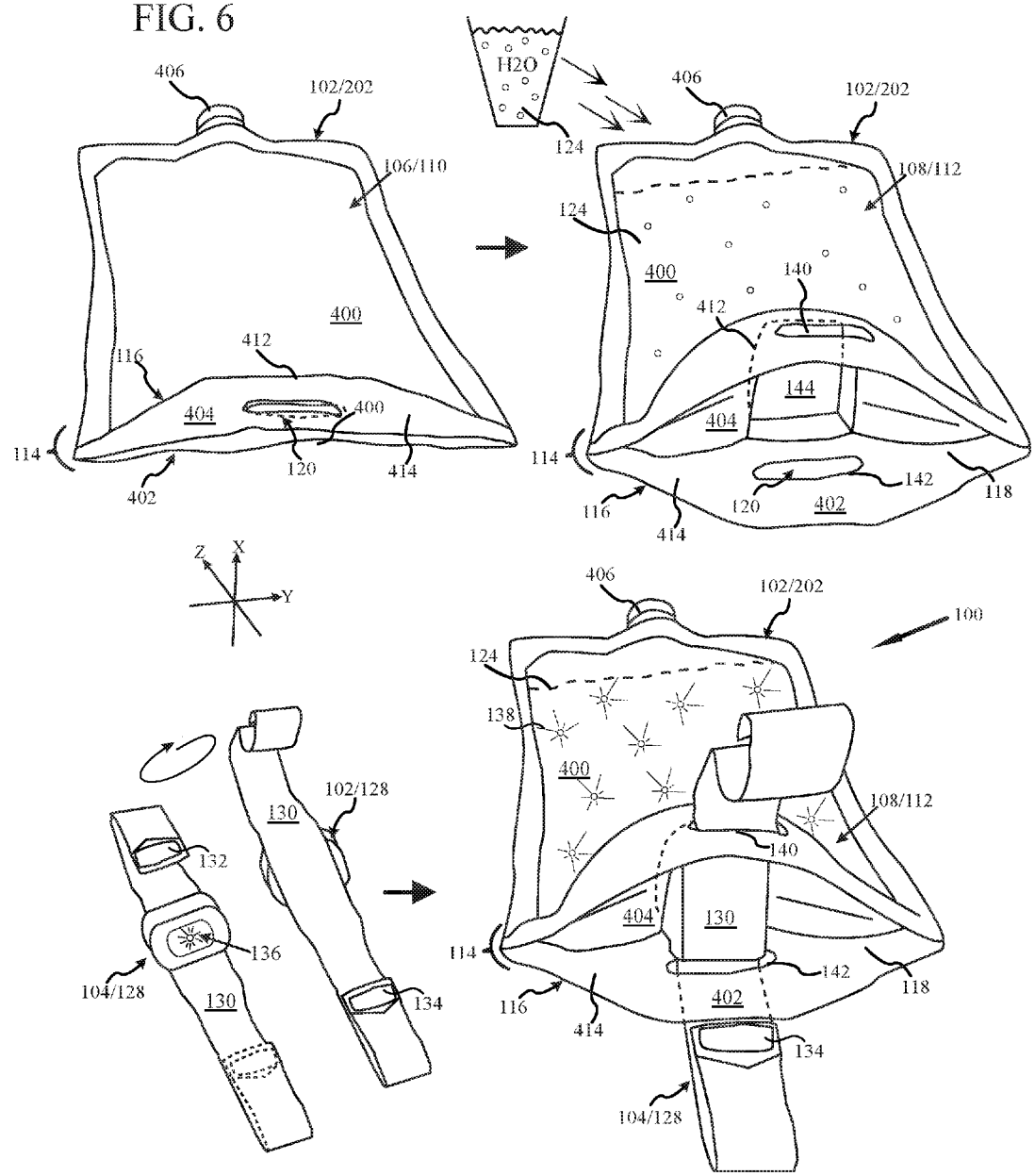
FIG. 6 is a illustrates a perspective view of a portable lantern in accordance with an alternative embodiments of the present invention.

FIG. 6 further exemplifies that the nature of the portable lantern 100 remains unchanged despite variations in how the hydration bladder 102 may be fabricated. More specifically, FIG. 6 substantially parallels FIG. 1.

Indeed as shown in FIG. 6, portable lantern 100 is provided by a collapsible hydration bladder 202 as described above having generally flexible panels 400 and 402, folded flexible panel 404, and valve 406, and a light source 104 suitable for temporary attachment to the outside of the hydration bladder 202. The nature of the collapsible translucent hydration bladder 202 is highly advantageous, as it has both a compact first state 106 that is suitable for compact storage and an expanded second state 108 suitable for containing a liquid. Moreover, the first state 106 may be understood and appreciated as an empty state 110 and the second state 108 maybe understood and appreciated as a liquid containing state 112.

The hydration bladder 202 has a bottom section 114 provided by folded flexible panel 404 that is structured and arranged to expand and provide a base 116 in the second state 108, i.e., the liquid containing state 112, to support the hydration bladder 102 in a generally upright position. The hydration bladder 202 is also understood and appreciated to be translucent.

For at least one embodiment, the base 116 further provides a convex recess 118 to receive the light source 104. The bottom section 114 also provides at least one coupler 120 to assist with temporarily coupling the light source 104 against the convex recess 118. Light of course may be appreciated as a wave. In optics, the angle of incidence is the angle between a ray incident on a surface and a line normal to the surface at the point of incidence. To achieve the advantageous portable lantern 100 as set forth herein, the temporary coupling of the light source 104 against the convex recess 118 is intended to achieve a presentation of the light waves as close to the normal as possible so as to achieve maximum transmission of the light into the hydration bladder. To the extent that some light waves reflect off the surface of the hydration bladder material, as the light source 104 is physically against the material, the reflected rays may well be re-directed by the reflector(s) within the light source 104 back into the hydration bladder 202.

As shown, the hydration bladder 102 has at least one valve 406 which may be operated by a user so as to introduce a liquid such as water 124 into the hydration bladder 202 and in so doing transition the state of the hydration bladder 202 from the empty state 110 to the expanded liquid containing state 112. This liquid, such as water 124 will also serve to diffuse and or disperse the light as provided by the light source 104 through the material of the hydration bladder and thereby provide the portable lantern 100.

Figure 7:
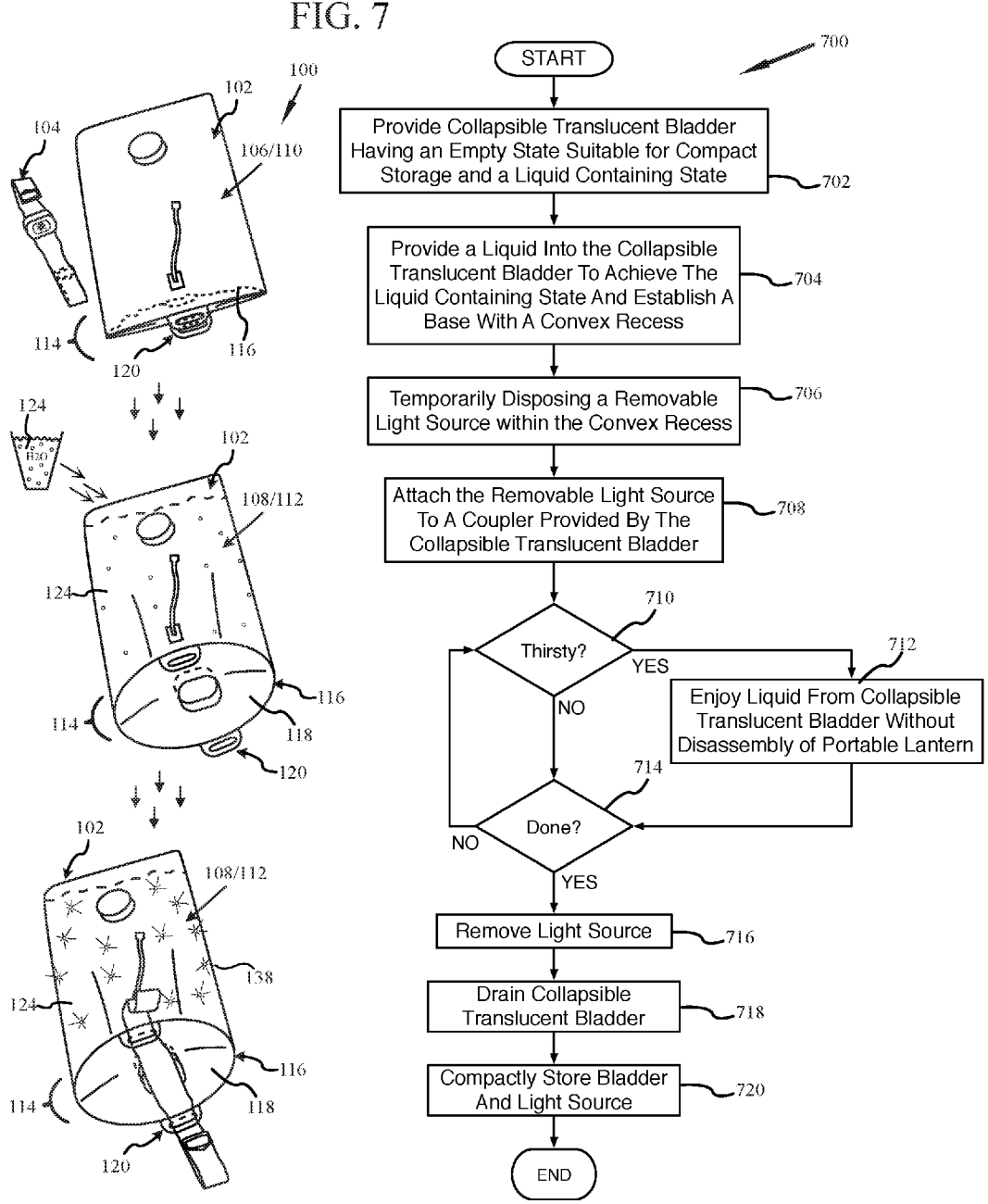
FIG. 7 is a flow diagram for a method of providing a portable lantern in accordance with embodiments of the present invention.

FIG. 7 in connection with FIGS. 1-8 provides a high level flow diagram for providing a portable lantern 100 in accordance with at least one embodiment. It will be appreciated that the described method need not be performed in the order in which it is herein described, but that this description is merely exemplary of one method of providing a portable lantern 100.

In general, method 700 commences by providing a collapsible translucent bladder 102 having an empty state suitable for compact storage and a liquid containing state, block 702. A liquid is then provided into the collapsible translucent bladder 102 to achieve the liquid containing state and establish a base 116 with a convex recess 118, block 704. A removable light source 104 is then temporarily disposed with the convex recess 118, block 706. The removable light source 104 is then attached to a coupler 120 provided by the translucent collapsible bladder 102, block 708.

When the light source is activated the light passes through the material of the collapsible translucent bladder 102 and is dispersed by the liquid within the bladder 102 thus providing the portable lantern 100.

As indicated by decision 710, if the user is thirsty and wishes to enjoy some of the liquid beverage from within the bladder 102, he or she may do so without disassembly of the portable lantern 100, block 712.

The portable lantern 100 may be used for whatever period is desired, of course understanding that the power source for the removable light source 104 may impose a practical limitation upon this period.

When use of portable lantern 100 is no longer required or desired, decision 714, the light source may be removed, block 716. The collapsible translucent bladder may then be drained, block 718. And, the now empty collapsible translucent bladder and removable light source 104 may be compactly stored, block 720.

Moreover, with respect to activities such as camping and hiking, it is understood and appreciated that portable lantern 100 may be compactly stored and brought into the environment without any liquid present. Although a large number of water born parasites and potential pathogens may be present in locally available water, these elements are not an issue for use of the water in providing portable lantern 100.

In other situations, the collapsible translucent bladder 102 may indeed be used to carry drinkable water, the portable lantern 100 simply provided by attaching the removable light source 104, and thereby avoiding the need to bring a specific lantern device.

Changes may be made in the above methods, systems and structures without departing from the scope hereof. It should thus be noted that the matter contained in the above description and/or shown in the accompanying drawings should be interpreted as illustrative and not in a limiting sense. The following claims are intended to cover all generic and specific features described herein, as well as all statements of the scope of the present method, system and structure, which, as a matter of language, might be said to fall there between.

What is claimed is:
1. A portable lantern, comprising:
a collapsible translucent hydration bladder, the bladder having an empty state that is suitable for compact storage and a liquid containing state, the bladder having a bottom section structured and arranged to expand and provide a base in the liquid containing state to support the bladder in a generally upright position; and a light source suitable for temporary attachment to the bottom of the hydration bladder, the light source emitting light into the bladder to be dispersed by liquid when disposed within the bladder to provide a portable lantern.

2. The portable lantern of claim 1, wherein the base further provides a convex recess to receive the light source.

3. The portable lantern of claim 2, wherein the light source is a headlamp with a strap, the bottom section of the bladder further providing a coupler to temporarily engage the strap and hold the headlamp against the convex recess.

4. The portable lantern of claim 1, wherein at least one liquid valve is disposed within the hydration bladder opposite from the bottom section providing the base in the liquid containing state.

5. The portable lantern of claim 1, wherein at least one liquid valve is attached to the hydration bladder by a tube, permitting a user to extract liquid from the bladder while configured as a lantern.

6. The portable lantern of claim 1, wherein the empty state of the hydration bladder has a first internal volume and the liquid containing state has a second internal volume, the second internal volume greater then the first internal volume.

7. The portable lantern of claim 1, wherein the empty state is suitable for storage by rolling or folding.

8. The portable lantern of claim 1, wherein a liquid disposed within the translucent bladder provides liquid pressure against the bladder and provides at least a partial compressive grip upon the removable light source.

9. A portable lantern, comprising:
a collapsible translucent hydration bladder having a bottom section structured and arranged to expand and provide a base in a liquid containing state to support the bladder in a generally upright position, the bladder further providing a flexible convex recess to receive a light source, light from the light source being emitted into the bladder and disposed by liquid when disposed within the bladder.

10. The portable lantern of claim 9, further including a light source suitable for temporary placement within the convex recess.

11. The portable lantern of claim 10, wherein the light source is a headlamp with a strap, the bladder further providing a coupler to temporarily engage the strap and hold the headlamp against the convex recess.

12. The portable lantern of claim 9, wherein the base further provides the convex recess to receive the light source.

13. The portable lantern of claim 9, wherein at least one liquid valve is disposed within the hydration bladder opposite from the bottom section providing the base in the liquid containing state.

14. The portable lantern of claim 9, wherein at least one liquid valve is attached to the hydration bladder by a tube, permitting a user to extract liquid from the bladder while configured as a lantern.

15. The portable lantern of claim 9, wherein a liquid disposed within the translucent bladder provides liquid pressure against the bladder and provides at least a partial compressive grip upon the removable light source.

16. A portable lantern, comprising:
a collapsible translucent hydration bladder, the bladder having an empty state that is suitable for compact storage and a liquid containing state, the bladder having a bottom section structured and arranged to expand and provide a base in the liquid containing state to support the bladder in a generally upright position, the base further having a convex recess to receive a light source when temporarily disposed within the convex recess of the base, light from the light source being emitted into the bladder and disposed by liquid when disposed within the bladder.

17. The portable lantern of claim 16, further including a light source suitable for temporary placement within the convex recess of the base.

18. The portable lantern of claim 17, wherein the light source is a headlamp with a strap, the bottom section of the bladder further providing a coupler to temporarily engage the strap and hold the headlamp against the convex recess.

19. The portable lantern of claim 16, wherein at least one liquid valve is disposed within the hydration bladder opposite from the bottom section providing the base in the liquid containing state.

20. The portable lantern of claim 16, wherein at least one liquid valve is attached to the hydration bladder by a tube, permitting a user to extract liquid from the bladder while configured as a lantern.

21. The portable lantern of claim 16, wherein a liquid disposed within the translucent bladder provides liquid pressure against the bladder and provides at least a partial compressive grip upon the removable light source.

* * * * *